(12) United States Patent
Rothweiler

(10) Patent No.: US 10,869,554 B2
(45) Date of Patent: Dec. 22, 2020

(54) COLLAPSIBLE FURNITURE ASSEMBLY

(71) Applicant: Gregory Rothweiler, Minneapolis, MN (US)

(72) Inventor: Gregory Rothweiler, Minneapolis, MN (US)

( * ) Notice: Subject to any disclaimer, the term of this patent is extended or adjusted under 35 U.S.C. 154(b) by 0 days.

(21) Appl. No.: 16/601,922

(22) Filed: Oct. 15, 2019

(65) Prior Publication Data

US 2020/0121083 A1    Apr. 23, 2020

Related U.S. Application Data

(60) Provisional application No. 62/746,939, filed on Oct. 17, 2018.

(51) Int. Cl.
| | | |
|---|---|---|
| *A47C 4/04* | (2006.01) | |
| *A47C 9/10* | (2006.01) | |
| *G05B 23/02* | (2006.01) | |
| *G06Q 10/06* | (2012.01) | |
| *G05B 15/02* | (2006.01) | |

(52) U.S. Cl.
CPC ............. *A47C 4/04* (2013.01); *A47C 9/10* (2013.01); *G05B 15/02* (2013.01); *G05B 23/0283* (2013.01); *G06Q 10/06316* (2013.01)

(58) Field of Classification Search
CPC ...... G05B 23/0283; G05B 15/02; A47C 4/04; A47C 9/10; G06Q 10/06316
See application file for complete search history.

(56) References Cited

U.S. PATENT DOCUMENTS

| | | | | |
|---|---|---|---|---|
| 1,963,835 A * | 6/1934 | Deland | ........... | A47C 4/045 |
| | | | | 297/44 |
| 2,521,412 A * | 9/1950 | Sack | ........... | A47C 16/005 |
| | | | | 297/359 |
| 3,807,792 A * | 4/1974 | Smith | ........... | A47B 3/14 |
| | | | | 297/54 |
| 3,929,373 A * | 12/1975 | Gawlinski | ........... | A47C 1/14 |
| | | | | 297/19 |
| 4,390,204 A * | 6/1983 | Fleishman | ........... | A47C 4/021 |
| | | | | 297/16.1 |
| 5,390,999 A * | 2/1995 | Fuller | ........... | A47B 83/008 |
| | | | | 297/377 |
| 6,186,593 B1 * | 2/2001 | Garneau | ........... | A47B 83/008 |
| | | | | 248/464 |
| 8,186,754 B2 * | 5/2012 | Sharrow | ........... | A47C 4/04 |
| | | | | 297/23 |
| 9,113,707 B2 * | 8/2015 | Moore | ........... | A47C 4/10 |
| 9,814,317 B2 * | 11/2017 | Yip | ........... | A47C 1/026 |

(Continued)

*Primary Examiner* — Philip F Gabler

(57) ABSTRACT

A collapsible furniture assembly includes a seat that has a top side, a bottom side, a front edge, a rear edge, a first lateral edge and a second lateral edge. A backrest has a front side, a rear side, a bottom edge, a top edge, a first side edge and a second side edge. A pair of hinges hingedly couples the backrest to the seat such that the front side is movable between stored and upright positions. The bottom edge of the backrest has a pair of notches extending therein. A pair of supports is each pivotally coupled to the bottom side. The supports are positionable in a stored position lying against the bottom side or a deployed position extending downwardly from the bottom side. Each of the supports is extendable into one of the notches to releasably retain the supports in the deployed condition.

11 Claims, 6 Drawing Sheets

(56) References Cited

U.S. PATENT DOCUMENTS

2007/0187996 A1\* 8/2007 Shabram ................. A47C 4/52
  297/16.1
2016/0081479 A1\* 3/2016 Lin ......................... A47C 4/24
  297/16.1

\* cited by examiner

COLLAPSIBLE FURNITURE ASSEMBLY

CROSS-REFERENCE TO RELATED APPLICATIONS

I hereby claim the benefit under 35 U.S.C. Section 119(e) of U.S. Provisional application 62/746,969 filed Oct. 17, 2018.

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The invention includes collapsible furniture constructions wherein the legs, and potentially other portions of the furniture, are foldable upon themselves for storage and transportation purposes while still adequately supporting a weight in a manner as intended.

(2) Description of Related Art Including Information Disclosed Under 37 CFR 1.97 and 1.98

The disclosure and prior art relates to collapsible furniture devices and more particularly pertains to a new collapsible furniture devices which allow for easy folding of the legs against a bottom side of the furniture, which may include tables and chairs, and whereupon the legs, after deploying, engage areas of the furniture to remain in a deployed condition and the furniture in an upright position.

BRIEF SUMMARY OF THE INVENTION

An embodiment of the disclosure meets the needs presented above by generally comprising a seat that has a top side, a bottom side, a front edge, a rear edge, a first lateral edge and a second lateral edge. A backrest has a front side, a rear side, a bottom edge, a top edge, a first side edge and a second side edge. A pair of hinges hingedly couples the backrest to the seat such that the front side is movable between a stored position and an upright position. The bottom edge of the backrest has a pair of notches extending therein and through the front and rear sides. A pair of supports is each pivotally coupled to the bottom side and each support is positionable in a stored position lying against the bottom side or a deployed position extending downwardly from the bottom side. Each of the supports is extendable into one of the notches when the supports are in the deployed position to releasably retain the supports in the deployed condition.

Another embodiment of the disclosure meets the needs presented above by generally a panel that has a top side, a bottom side, a front edge, a rear edge, a first lateral edge and a second lateral edge. A plate has a front side, a rear side, a bottom edge, a top edge, a first side edge and a second side edge. A hinge hingedly couples the plate to the panel such that the front side is movable between a stored position wherein an angle formed between the bottom side and the front side is less than 10° and an upright position wherein an angle formed by the bottom side and the front side is less than 90°. The bottom edge of the plate has a pair of notches extending therein and through the front and rear sides. The notches are spaced from each other. A pair of supports each is pivotally coupled to the bottom side, wherein the supports are positionable in a stored position lying against the bottom side or a deployed position extending downwardly from the bottom side. Each of the supports is extendable into one of the notches when the supports are in the deployed position to releasably retain the supports in the deployed condition.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
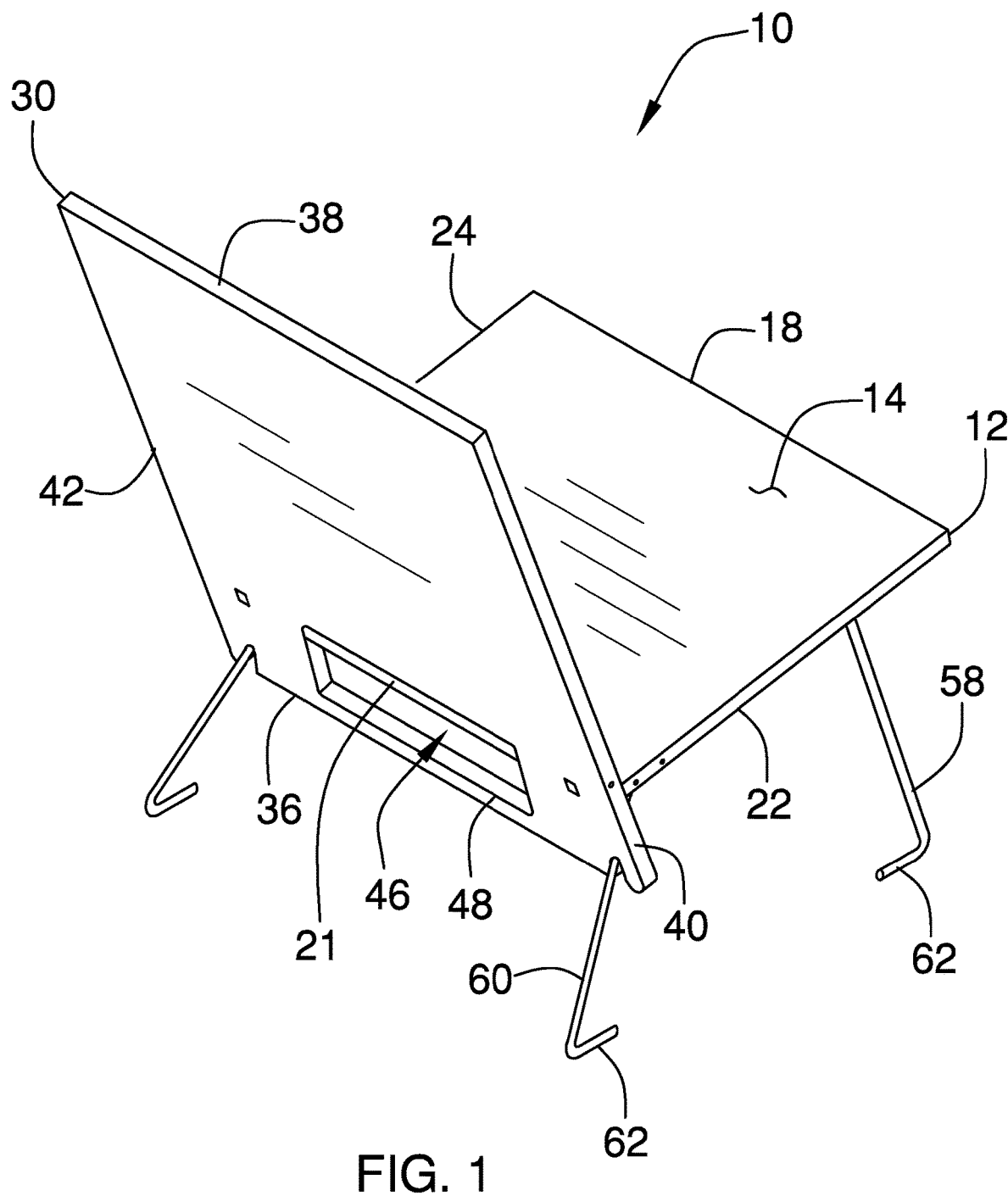
FIG. 1 is a rear isometric view of a collapsible furniture assembly according to an embodiment of the disclosure.

With reference now to the drawings, and in particular to FIGS. 1 through 6 thereof, a new collapsible furniture devices embodying the principles and concepts of an embodiment of the disclosure and generally designated by the reference numeral 10 will be described.

As best illustrated in FIGS. 1 through 6, the collapsible furniture assembly 10 generally comprises a seat 12 having a top side 14, a bottom side 16, a front edge 18, a rear edge 20, a first lateral edge 22 and a second lateral edge 24. The seat 12 may have a planar top side 14 and a planar bottom side 16, though the seat 12 may be contoured for the comfort of the user. While no cushion is shown on the top side 14, cushions may be contemplated and the size of the seat may vary depending on stylistic and comfort considerations. A backrest 30 is provided including a front side 32, a rear side 34, a bottom edge 36, a top edge 38, a first side edge 40 and a second side edge 42. As with the seat 12, the backrest 30 may have any conventional size, cushioning and shape as would be found on a conventional chair. However, each of the seat 12 and backrest 30 each may typically have a width (measured between first 22 and second 24 lateral edges and first 40 and second 42 side edges) between 1.0 feet and 6.0 feet, and lengths (measured between front 18 and rear 20 edges and bottom 36 and top 38 edges) between 1.0 feet 4.0 feet. The seat 12 and backrest 30 will be constructed of conventional, rigid materials used for chairs including plastics, metals, woods, composites and the like.

Figure 3:
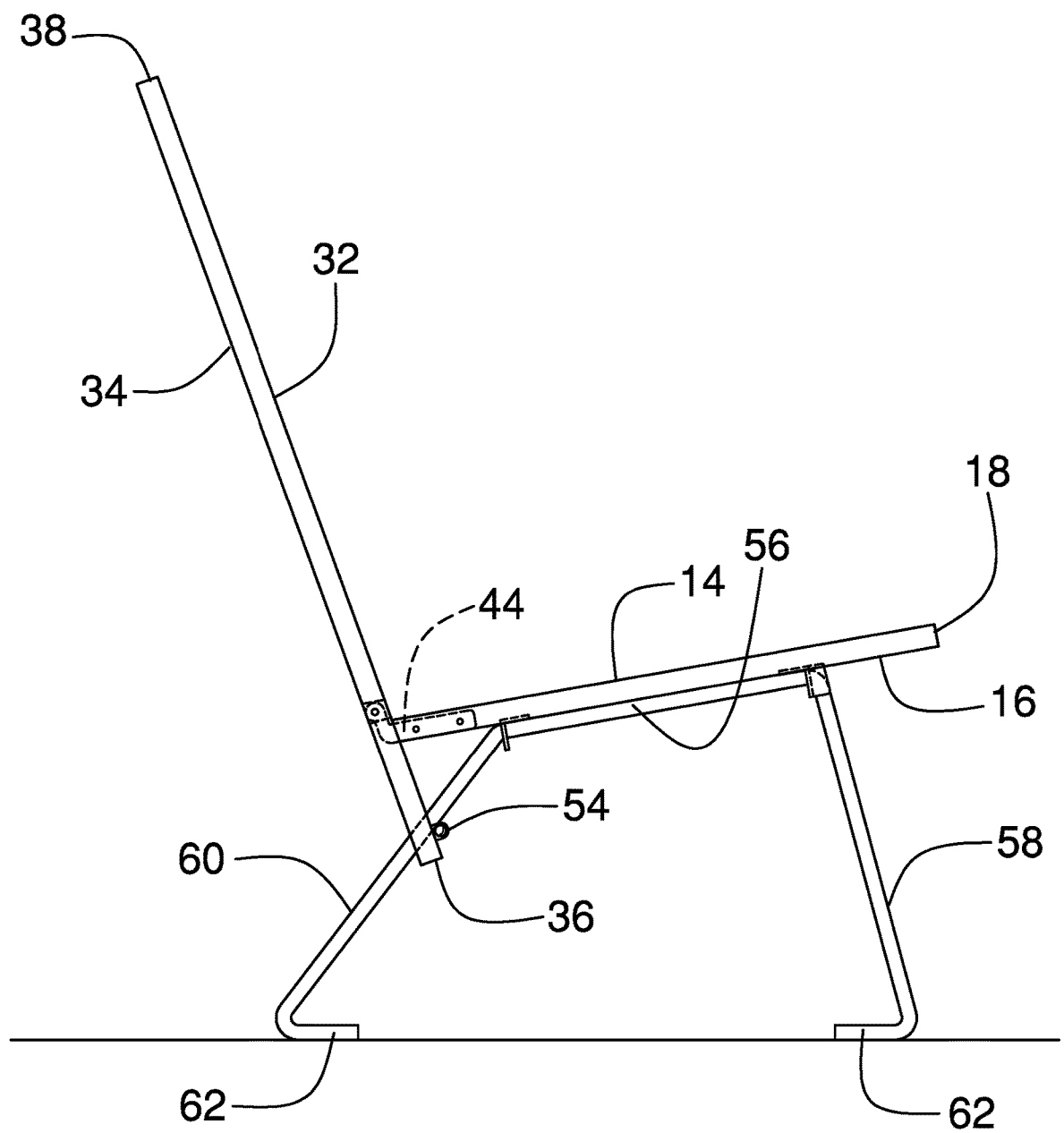
FIG. 3 is a side view of an embodiment of the disclosure.

The backrest 30 is hingedly coupled to the seat 12 and this may be accomplished with a pair of hinges 44 hingedly such that the front side 32 is movable between a stored position wherein an angle formed between the top side 14 and the front side 32 is less than 10° and an upright position wherein an angle formed by the top side 14 and the front side 32 is greater than 80°. The angle formed in the stored position will typically be less than 10° and furthermore may be 0° wherein the top side 14 abuts and lies flat against the front side 32. The upright position will often include an angle of at least 90° for the comfort of the user and the stability of the assembly 10. The hinges 44 are attached to the back rest 30 and extend outwardly from the front side 32. The hinges 44 are positioned nearer to the bottom edge 36 than the top edge 38 but are spaced from the bottom edge 36 typically at least 1.5 inches. Thus, the bottom edge 36 is positioned below a plane of the bottom side 16 of the seat 12 when the backrest 30 is in the upright position as is shown in FIG. 3. The hinges 44 are attached to the rear edge 20 and are spaced from each other. More specifically, as can be seen in the Figures, the hinges 44 may each include a pair of arms wherein one of the arms is embedded into the backrest 30 and one extends into the rear edge 20, though any conventional hinge may be utilized. While a pair of hinges 44 is being utilized, a single hinge or more than two hinges may alternatively be utilized.

Figure 2:
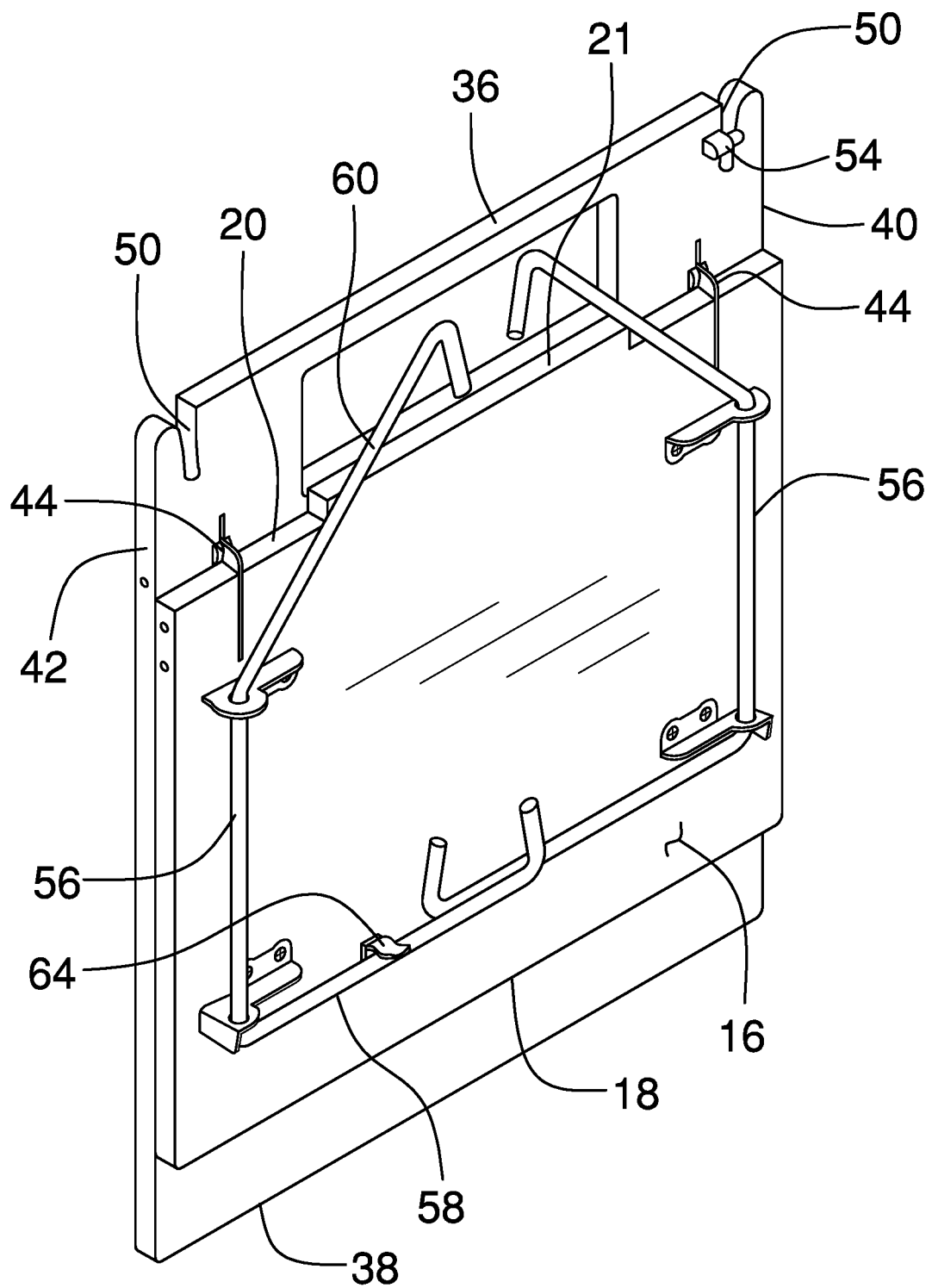
FIG. 2 is a bottom isometric view of an embodiment of the disclosure.
Figure 4:
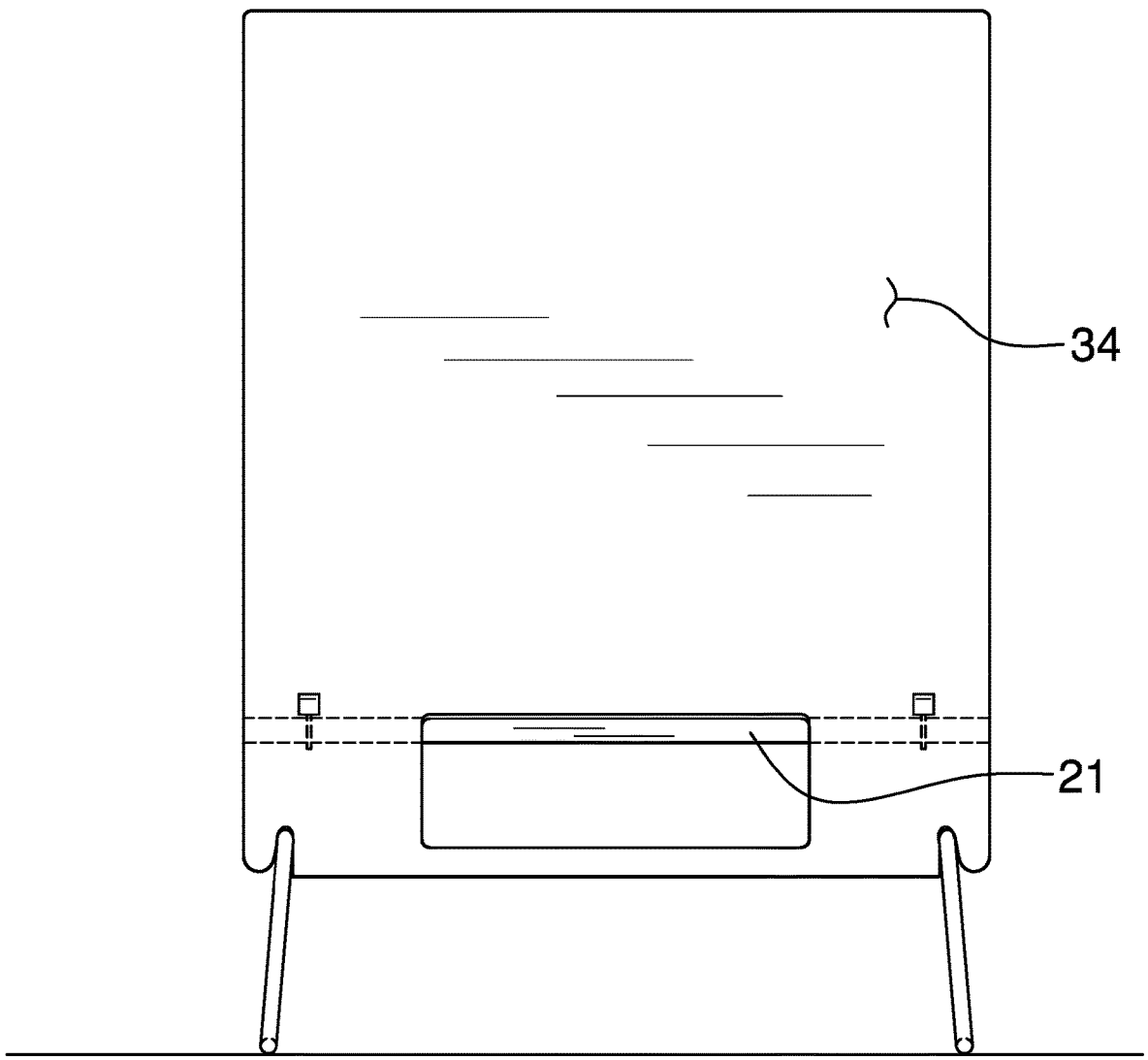
FIG. 4 is a rear view of an embodiment of the disclosure.
Figure 5:
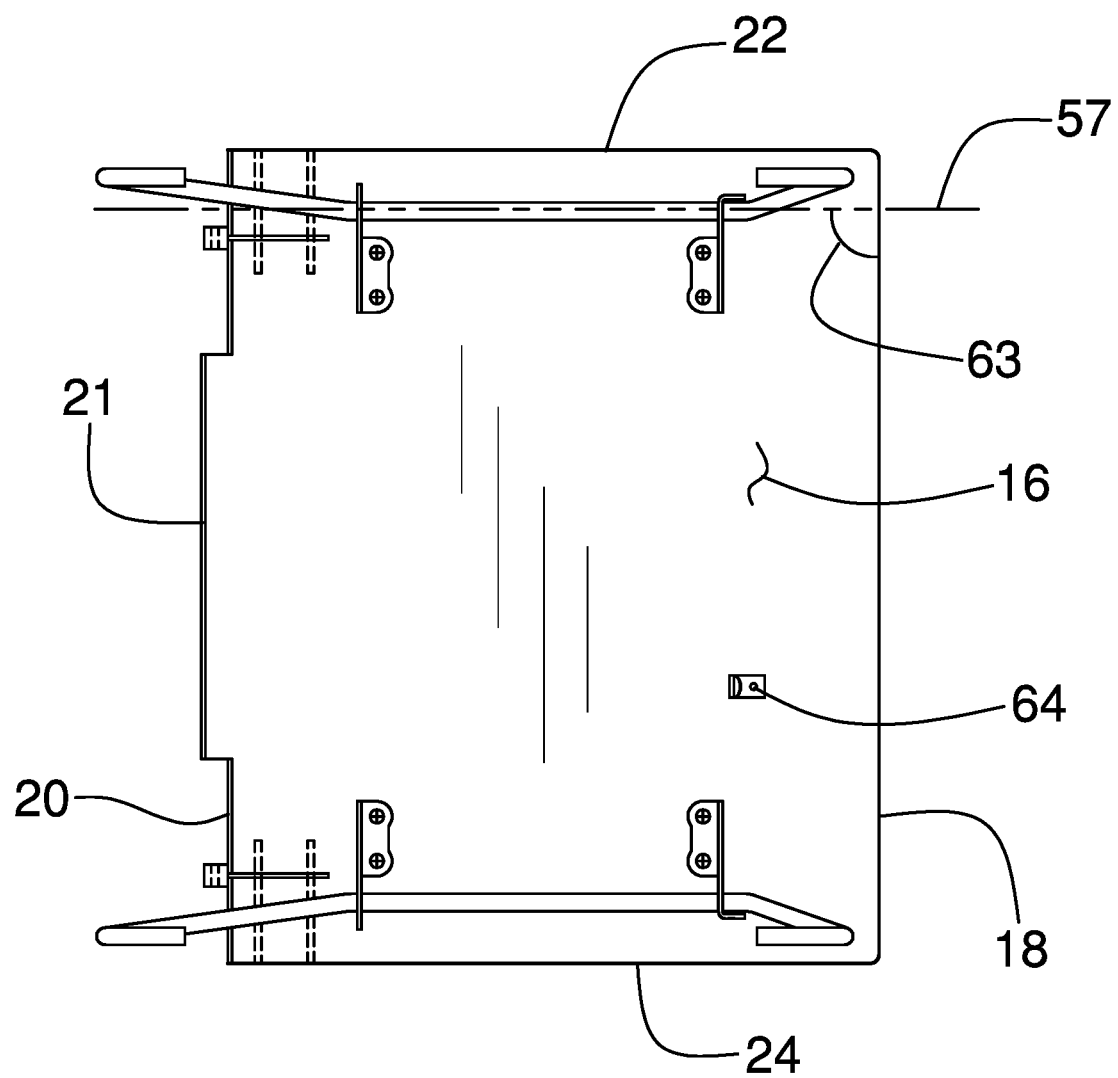
FIG. 5 is a bottom view of an embodiment of the disclosure, having a backrest of FIG. 1 removed for clarity.

The backrest 30 has an opening 46 therein extending into the front side 32 and outwardly of the rear side 34. The opening 44 is spaced from the first 40 and second 42 side edges and is positioned adjacent to the bottom edge 36. An area of the backrest 30 extends from the bottom edge 36 to the opening 46 defines a grip 48 as can be seen in FIG. 2. The grip 48 will typically have a height from the bottom edge 36 to the opening 46 of between 0.75 inches and 3.0 inches. Moreover, the rear edge 20 may include a flange 21 as shown in FIGS. 4 and 5 which extends into and abuts an upper edge of the opening 46 when the backrest 30 is in the upright position to further stabilize the backrest 30 and the seat 12 relative to each other.

The bottom edge 36 of the backrest has a pair of notches 50 extending therein and through the front 32 and rear 34 sides. The notches 50 are spaced from each other such that each of the first 40 and second 42 side edges is adjacent to one of the notches 50. The opening 46 is positioned between the notches 50. It should be understood that while the notches 50 extend into the backrest 30, a structure is envisioned wherein the notches are formed into an external member attached to the backrest 30 and which, for example, may extend below the bottom edge 36 and function as notches for purposes discussed below.

A pair of supports 52 is provided and each of the supports 52 is pivotally coupled to the bottom side 16. Each of the supports 52 is positionable in a stored position lying against the bottom side 16 or a deployed position extending downwardly from the bottom side 16. Each of the supports 52 is extendable into one of the notches 50 when the supports 50 are in the deployed position to releasably retain the supports 52 in the deployed condition. A locking member 54 may be provided to releasably lock the support in the associated notch 50. The locking member may include an outwardly biased catch that may be depressed to release the support 52 from a corresponding notch 50, though any mechanical coupler may be utilized to releasably retain the supports 52 in their notches 50.

More specifically, each of the supports 52 includes a central rod 56 that is elongated and has a longitudinal axis intersecting the front side 32 when the backrest 30 is in the upright position. Particularly, the longitudinal axis and the front side 32 may form an angle equal to 90°+/−20° when the top side 14 and the front side 32 are orientated perpendicular to each other. The central rod 56 is rotatably coupled to the bottom side 16 by brackets such that the central rod 56 is rotatable along is longitudinal axis.

The supports 52 each further include a front leg 58 and a rear leg 60. The front leg 58 is attached to a first end of the central rod 56 adjacent to the front edge 18 and forms an angle with the central rod 56 generally between 60° and 150°. The rear leg 60 is attached to the second end of the central rod adjacent 56 to the rear edge 20. The rear leg 60 forms an obtuse angle with the central rod 56 such that the rear leg 60 extends rearwardly of the central rod 56, and ultimately down and rearwardly from the backrest 30 when the supports 52 are in the deployed position, and wherein the rear leg 60 engages one of the notches 50. As can be seen in FIG. 3, the rear legs 60 are placed in the notches 50 to serve two purposes. The first is to retain the supports 52 in the deployed position seen in FIGS. 1 and 3, while the second is to retain the backrest 30 in a fixed position relative to the seat 12. Thus, without adding locks, couplers, fasteners and the like, the assembly 10 may be easily moved between stored and upright positions. As can also be seen in FIG. 3, distal ends of the front and rear legs relative to the central rod, may comprise feet 62. The feet 62 may include attachments or simply an inwardly bent portion of the front 58 and rear 60 legs as is depicted to provide greater stability for the assembly 10 and to prevent the front 58 and rear 60 legs from piercing and sinking into soft terrain. The front 58 and rear legs 60 may alternatively be joined together by an extension extending therebetween to form a single, elongated support.

A catch 64 is attached to the bottom side 56 of the seat 16 and releasably engages one of the supports 52 when the supports 52 are in the stored position. As can be seen in FIG. 2, the catch 64 may comprise a biased tab that frictionally engages one of the front legs 58. The supports 52 are foldable over each other such that front legs 58 overlap as shown best in FIG. 2. In this position, the retention of one front leg 58 in effect retains both front legs 58 against the bottom side 16. The front leg 58, rear leg 60, and central rod 56 of each of support 52 will typically lie in a same plane with respect to each other such that when the front leg 58 abuts the bottom side 16, the corresponding rear leg 60 will also abut the bottom side 16. Thusly, the supports 52 are foldable over each other such than the support 52 engaged with the catch 64 retains the other one of the supports 52 in the stored position.

Figure 6:
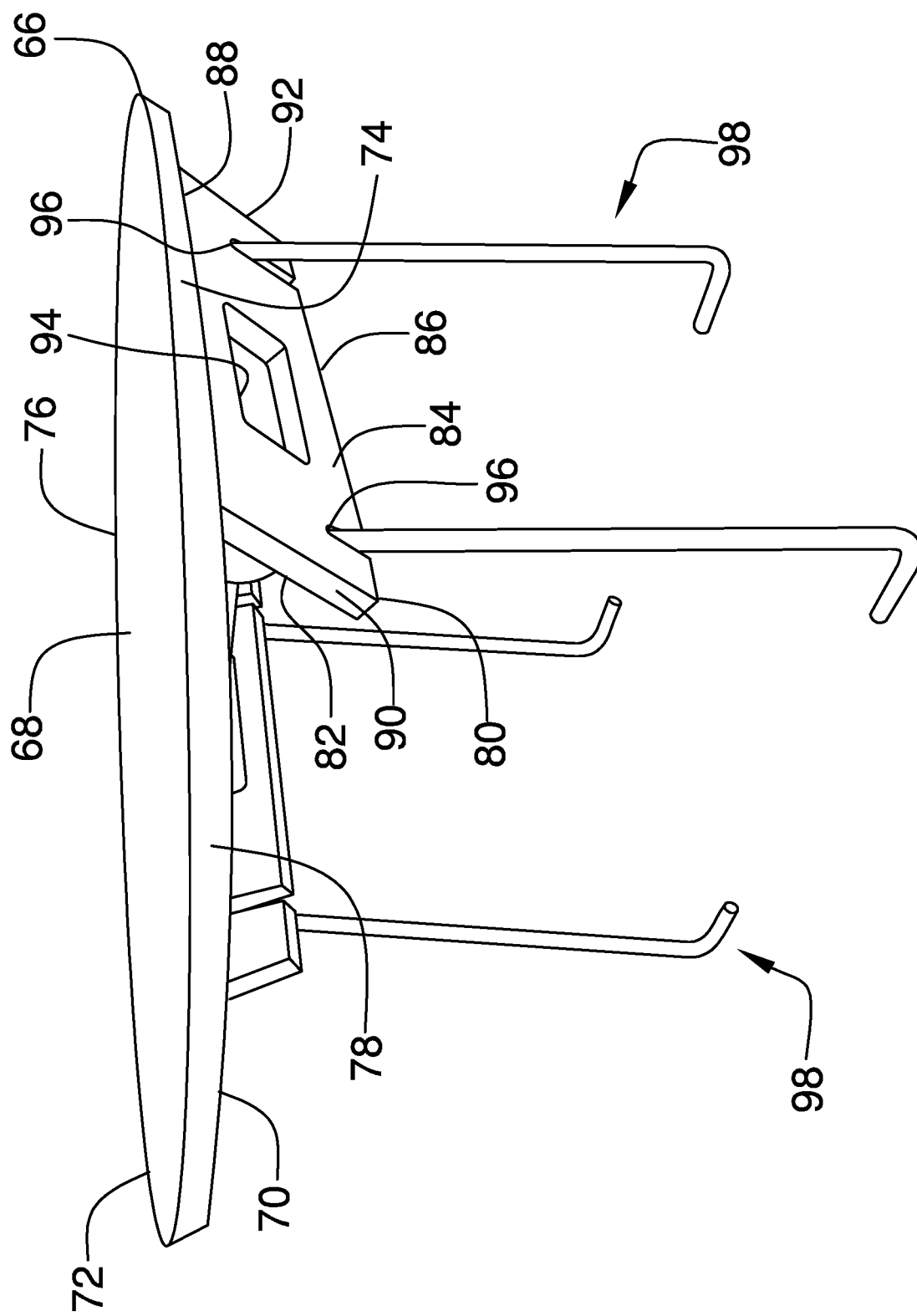
FIG. 6 is a bottom isometric view of an embodiment of the disclosure.

A second embodiment employing many of the same principles as above is found in FIG. 6. In this embodiment, a table is formed in the upright position as opposed to a chair. The second embodiment includes a panel 66, substituted for the seat 12, which has a top side 68, a bottom side 70, a front edge 72, a rear edge 74, a first lateral edge 76 and a second lateral edge 78. A plate 80, as opposed to the backrest 30, has a front side 82, a rear side 84, a bottom edge 86, a top edge 88, a first side edge 90 and a second side edge 92. While a pair of plates 80 may be utilized, only one may be required for proper functioning of this embodiment. However, when a pair of plates 80 is used, the relative directions for the above would be reversed for the second plate 80.

A hinge, not shown, hingedly couples the plate 80 to the bottom side 70 of the panel 66 such that the front side 82 is movable between a stored position, wherein an angle formed between the bottom side 70 and the front side 82 is less than 10°, and an upright position, wherein an angle formed by the bottom side 70 and the front side 82 is less than 90°. The front side 82 herein is defined to be the side facing away from a perimeter edge of the panel 12 such that the plate 80 pivots toward a central area of the panel 66 when the plate 80 is in the stored position. The hinge on the plate 80 may be structured to prevent the plate 80 from forming an obtuse angle with the bottom side 70 and may specifically keep the angle between the front side 82 and the bottom side 70 at less than 80° as is shown in the Figures. The plate 80 may include an opening 94 to serve a handle.

The bottom edge 86 of the plate 80 has a pair of notches 96 extending therein which further extend through the front 82 and rear 84 sides. The notches 96 are spaced from each other. A pair of supports 98 is each pivotally coupled to the bottom side 70. The supports 98 are positionable in a stored position lying against the bottom side 70 or a deployed position extending downwardly from the bottom side 70. Each of the supports 98 is extendable into one of the notches 96 when the supports 98 are in the deployed position to releasably retain the supports 98 in the deployed condition. The angle between the front side 82 and bottom side 70 is typically an acute angle utilize gravity to retain the supports 98 in the notches 96. The supports 98 of this embodiment include a front and rear leg having a same length and angle with respect to the central member and the central member may be mounted in a spaced relationship to the bottom side. Thus, when the plate(s) 80 are folded against the bottom side, the supports 98 may be positioned on the plate(s) 80 so that the plate(s) 80 are positioned between the supports 98 and the bottom side 70. A catch, not shown, may then be used to releasably secure the supports 98 in place and to retain the plate(s) 80 in the stored position.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A collapsible chair assembly comprising:
    a seat having a top side, a bottom side, a front edge, a rear edge, a first lateral edge and a second lateral edge;
    a backrest having a front side, a rear side, a bottom edge, a top edge, a first side edge and a second side edge;
    said backrest being hingedly coupled to said seat such that said front side is movable between a stored position and an upright position;
    said bottom edge of said backrest having a pair of notches extending therein and through said front and rear sides; and
    a pair of supports each being pivotally coupled to said bottom side, each of said supports being positionable in a stored position lying against said bottom side or a deployed position extending downwardly from said bottom side, each of said supports being extendable into one of said notches when said supports are in said deployed position to releasably retain said supports in said deployed condition.

2. The collapsible chair assembly according to claim 1, further including a pair of hinges hingedly coupling said backrest to said seat, wherein an angle formed between said top side and said front side is less than 10° in the stored position and wherein an angle formed by said top side and said front side is greater than 80° in the upright position.

3. The collapsible chair assembly according to claim 2, wherein said hinges are attached to said back rest and extend outwardly from said front side, said hinges being positioned nearer to said bottom edge than said top edge, said hinges being attached to said rear edge and being spaced from each other.

4. The collapsible chair assembly according to claim 1, wherein said backrest has an opening therein extending into said front side and outwardly of said rear side, said opening being spaced from said first and second side edges and being positioned adjacent to said bottom edge, an area of said backrest extending from said bottom edge to said opening defining a grip.

5. The collapsible chair assembly according to claim 4, wherein a flange extends rearwardly from said rear edge of said seat, said flange extending into and being abuttable against an upper edge of said opening when said backrest is in said upright position.

6. The collapsible chair assembly according to claim 1, wherein said notches are spaced from each other such that each of said first and second side edges is adjacent to one of said notches.

7. The collapsible chair assembly according to claim 1, wherein each of said supports includes:
    a central rod being elongated and having a longitudinal axis intersecting said front side when said backrest is in said upright position, said central rod being rotatably coupled to said bottom side such that said central rod is rotatably along is longitudinal axis;

a front leg being attached to a first end of said central rod adjacent to said front edge and forming an angle with said central rod generally between 60° and 150°; and a rear leg being attached to said second end of said central rod adjacent to said rear edge, said rear leg forming an obtuse angle with said central rod such that said rear leg extends rearwardly of said central rod when said supports are in said deployed position and engages one of said notches.

8. The collapsible chair assembly according to claim 7, wherein each of said supports further includes:

said front leg having a distal end with respect to said central rod;

said rear leg having a distal end with respect to said central rod; and a pair of feet, each distal end of said front and rear legs having one of said feet attached thereto.

9. The collapsible chair assembly according to claim 1, further including a catch being attached to said bottom side of said seat, said catch releasably engaging one of said supports when said supports are in said stored position, wherein said supports are foldable over each other such than the support engaged with said catch retains the other one of the supports in the stored position.

10. A collapsible chair assembly comprising:

a seat having a top side, a bottom side, a front edge, a rear edge, a first lateral edge and a second lateral edge;

a backrest having a front side, a rear side, a bottom edge, a top edge, a first side edge and a second side edge;

a pair of hinges hingedly coupling said backrest to said seat such that said front side is movable between a stored position wherein an angle formed between said top side and said front side is less than 10° and an upright position wherein an angle formed by said top side and said front side is greater than 80°, said hinges being attached to said back rest and extending outwardly from said front side, said hinges being positioned nearer to said bottom edge than said top edge, said hinges being attached to said rear edge and being spaced from each other;

said backrest having an opening therein extending into said front side and outwardly of said rear side, said opening being spaced from said first and second side edges and being positioned adjacent to said bottom edge, an area of said backrest extending from said bottom edge to said opening defining a grip;

said bottom edge of said backrest having a pair of notches extending therein and through said front and rear sides, said notches being spaced from each other such that each of said first and second side edges is adjacent to one of said notches, said opening being positioned between said notches;

a pair of supports each being pivotally coupled to said bottom side, each of said supports being positionable in a stored position lying against said bottom side or a deployed position extending downwardly from said bottom side, each of said supports being extendable into one of said notches when said supports are in said deployed position to releasably retain said supports in said deployed condition, each of said supports including:

a central rod being elongated and having a longitudinal axis intersecting said front side when said backrest is in said upright position, said central rod being rotatably coupled to said bottom side such that said central rod is rotatably along is longitudinal axis;

a front leg being attached to a first end of said central rod adjacent to said front edge and forming an angle with said central rod generally between 60° and 150°;

a rear leg being attached to said second end of said central rod adjacent to said rear edge, said rear leg forming an obtuse angle with said central rod such that said rear leg extends rearwardly of said central rod when said supports are in said deployed position and engages one of said notches;

a catch being attached to said bottom side of said seat, said catch releasably engaging one of said supports when said supports are in said stored position, wherein said supports are foldable over each other such than the support engaged with said catch retains the other one of the supports in the stored position.

11. A collapsible furniture assembly comprising:

a panel having a top side, a bottom side, a front edge, a rear edge, a first lateral edge and a second lateral edge;

a plate having a front side, a rear side, a bottom edge, a top edge, a first side edge and a second side edge;

a hinge hingedly coupling said plate to said panel such that said front side is movable between a stored position wherein an angle formed between said bottom side and said front side is less than 10° and an upright position wherein an angle formed by said bottom side and said front side is less than 90°;

said bottom edge of said plate having a pair of notches extending therein and through said front and rear sides, said notches being spaced from each other; and a pair of supports each being pivotally coupled to said bottom side, each of said supports being positionable in a stored position lying against said bottom side or a deployed position extending downwardly from said bottom side, each of said supports being extendable into one of said notches when said supports are in said deployed position to releasably retain said supports in said deployed condition.

* * * * *